United States Patent [19]
Munday

[11] 3,882,284
[45] May 6, 1975

[54] DIAL SIGNAL STORAGE AND TRANSMISSION ARRANGEMENT USING DUAL RECIRCULATING REGISTERS AND HAVING REPEAT CAPABILITY

[75] Inventor: John Charles Munday, Fife, Scotland

[73] Assignee: General Instrument Corporation, Clifton, N.J.

[22] Filed: Mar. 20, 1974

[21] Appl. No.: 452,685

[52] U.S. Cl. ................................................ 179/90 B
[51] Int. Cl. ........................................... H04m 1/42
[58] Field of Search .......... 179/90 CS, 90 BD, 90 B, 179/16 EC

[56] References Cited

UNITED STATES PATENTS

| | | | |
|---|---|---|---|
| 3,592,972 | 7/1971 | Lane | 179/90 CS |
| 3,601,552 | 8/1971 | Barnaby et al. | 179/90 B |
| 3,670,111 | 6/1972 | Bukosky et al. | 179/90 B |

*Primary Examiner*—Thomas W. Brown

[57] ABSTRACT

A storage arrangement, for storing sequences of digits required for telephone dialling and re-dialling, comprises a first recirculating register for the digits, a second recirculating register for a marker to mark the digit next to be read out, an excess bit position for the second register, gating means for gating the excess bit position and control means for controlling the gating means in dependence upon marker position and digit positions to enable the marker to move rearwardly relative to the sequence.

10 Claims, 10 Drawing Figures

DIAL SIGNAL STORAGE AND TRANSMISSION ARRANGEMENT USING DUAL RECIRCULATING REGISTERS AND HAVING REPEAT CAPABILITY

BACKGROUND OF THE INVENTION

This invention relates to telephone circuits.

There is a need at the present time for a storage arrangement for storing sequences of digits required for telephone dialling. In the present context dialling is intended to mean the provision of trains of pulses, equivalent to those conventionally produced by manual telephone dialling, or the provision of multifrequency dialling codes.

It is an object of the present invention to provide for these needs and to enable a number to be redialled automatically.

SUMMARY OF THE INVENTION

According to the invention there is provided a storage arrangement for storing sequences of digits required for telephone dialling, the arrangement comprising a first recirculating register means for storing a sequence of digits, a second register means for storing a marker bit to be recirculated synchronously with said sequence to mark the digit next to be read out from the first register means, the second register means having a bit position in excess of the number of digit positions in the first register means, gate means operable in a first mode to cause the excess bit position to be bypassed so that the marker bit can circulate in alignment with a digit in the first register means and also operable in a second mode to cause the excess bit position to be utilised to displace the marker bit rearwardly in relation to a sequence of digits in the first register means, and control means for controlling the gate means in dependence upon marker bit position and upon the digit positions to position the marker bit to mark the first digit to be read out, to displace the marker bit by one position rearwardly on read-out of a digit to mark the next digit to be read-out, and, subsequent to read out of all the digits, to set the gate means to the second mode to repeatedly offset the marker bit until it again marks the first digit of the sequence.

BRIEF DESCRIPTION OF THE DRAWINGS

For a better understanding of the invention and to show how the same may be carried into effect, reference will now be made, by way of example, to the accompanying drawings, in which.

DESCRIPTION OF PREFERRED EMBODIMENTS

The embodiment to be described in a push button dialler having self-contained data storage on an IGFET integrated circuit chip and with the capability of dialling out stored numbers at the correct fequency and pulsing conditions and in the order in which they are dialled in. If a number required cannot be contacted, the number is not erased, so that it can be dialled again.

The dialler includes a re-chargeable battery for the integrated circuit chip and for various relays. The dialler also has a punched card input so that numbers stored on cards can be read into the storage.

Figure 1A:
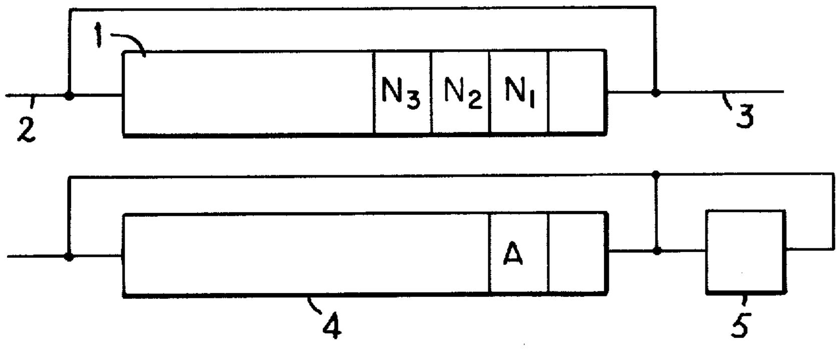
FIGS. 1*a* to 1*c* illustrate successive conditions of a storage arrangement.
Figure 1B:
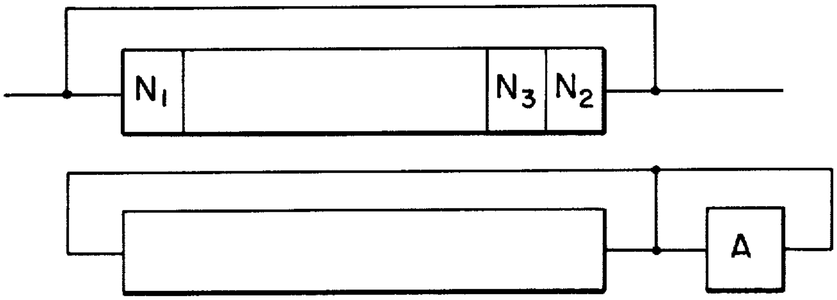
Figure 1C:
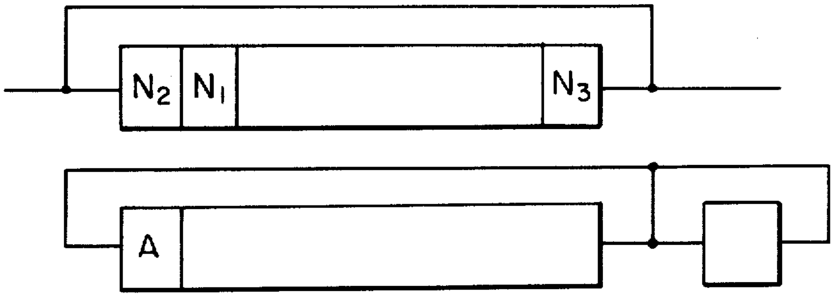

FIGS. 1*a* to 1*c* diagrammatically illustrate the storage features of this embodiment.

The storage comprises a main, 21 digit, recirculating store 1 having a capacity of 20 dialled digits $N_1$, $N_2$, $N_3$ . . . stored in the order of dialling and having been entered at input 2. Read-out occurs non-destructively at output 3. This store is composed of four 21 bit registers storing each digit in parallel B.C.D. format.

A marker, 21 bit, recirculating register 4 is provided to hold a marker bit A marking the digit next to be dialled out. An extra bit capacity is provided for the marker bit by a gated one bit store 5. Gating circuitry ensures that the digits are sequentially entered with the marker A aligned initially with the first digit of the sequence.

In FIG. 1*a* it is assumed that three digits $N_1$, $N_2$ and $N_3$ have been entered and that the marker A is aligned with the first digit $N_1$. This state has been reached in the following manner. Firstly the digit $N_1$ is entered onto the chip and the gating circuitry then looks for an empty digit position in the twenty-first storage bit position of the store 1 and the marker A in the twenty-first bit position of the register 4. At the next step in the recirculation of the store and register, the empty storage position of the store 1 will be available at the first position of the store 1, whilst the marker A will also be in the first position of its register 4. Accordingly, the input 2 is opened by the gating circuitry to allow the digit $N_1$ to enter. As described above the gating circuitry has effectively looked for an empty storage position in the store 1 in alignment with the marker A. In practice the gating circuitry is looking for the nearest available storage position to the marker A commencing with the position in alignment with the marker A and then scanning in the rearward direction. Accordingly, when the second digit $N_2$ arrives, the gating circuitry will locate the vacant storage position adjacent $N_1$ in the rearwarda direction. The gating circuitry will open the input 2 when it is sensed that this position is at the first storage position of the store 1. This operation continues until the whole number has been entered, and it will be apparent that the condition illustrated in FIG. 1*a* will have been achieved.

When read-out is required, the gating circuitry looks for the condition that the marker A is in its 21 bit position and also that a digit is in the 21 storage position of the store 1. Owing to the manner of storing the digits, this digit must be the first digit $N_1$. When this condition is sensed, read-out occurs to a device which produces the appropriate dialling pulses or dialling frequency codes. Simultaneously with read-out, the gating circuitry causes the marker A to pass to the 22 bit position, as shown in FIG. 1*b*, when the first digit $N_1$ will have been recirculated to the beginning of the store 1. When the storage is next stepped on, the position shown in FIG. 1*c* arises, in which the marker A is now aligned with the second digit. Further stepping occurs to bring $N_2$ and the marker A to the 21 position for read-out of $N_2$. This process continues until all the digits have been dialled out. It will be apparent that, after reading-out of all the digits, a condition is reached in which the marker A is sensed in the 21 bit position, but no number is in the associated storage bit position. This causes the gating circuitry to operate so that the marker A then recirculates through 22 bit positions whilst the digits recirculate through 21 positions until a digit (which will be the first digit $N_1$) has reached the 21 bit position of the store 1 simultaneously with the marker A reaching its 21 bit position. On sensing this condition, the gating circuitry will cause the marker A to recirculate through 21 bit positions so that the situation shown in FIG. 1*a* then exists in readiness for redialling.

Figure 2:
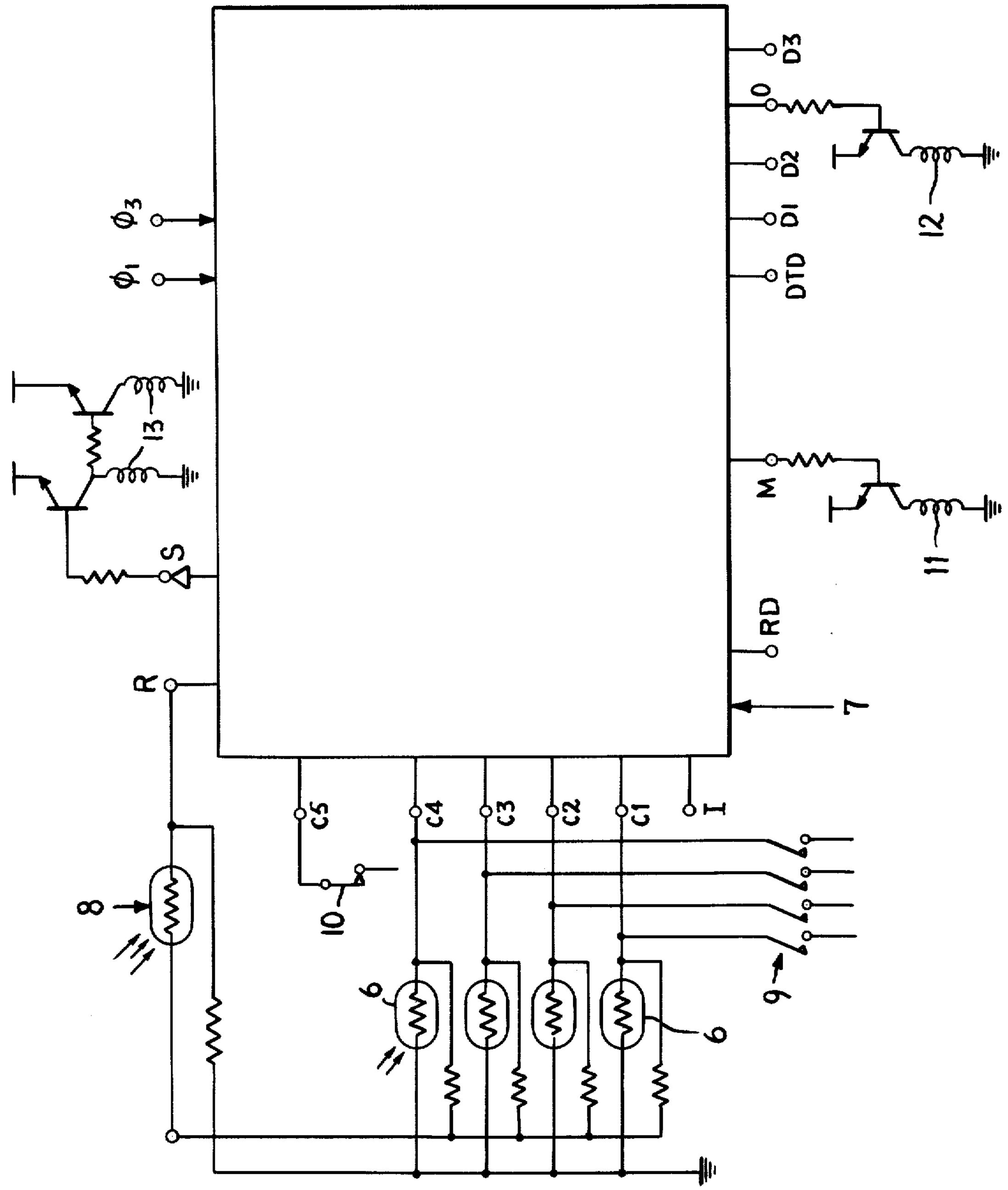
FIG. 2 illustrates diagrammatically an electronic, telephone, dialler.

FIG. 2 is a diagram of the dialler for punched card input where each digit, and also the requirement for a long interdigit pause, is represented in four bit binary code.

The data can be supplied to inputs $C_1$ to $C_4$ of the integrated circuit chip 7 by a punched card reader having light-sensitive semiconductors 6. This chip is shown in more detail in FIGS. 3 and 4. An additional light-sensitive semiconductor 8 is connected to a reset input R to define the presence or absence of a punched card. A 0 signal at input R resets the circuits of the chip, inserts the marker in the marker register 4 and inserts an initial pause interval into the counter B1 to B4 shown in FIGS. 3 and 4. Also shown are keys 9 to represent the actuation of the chip by a push button dialling mechanism. A further key 10 is opened each time any other key is operated and is connected to a common input C5.

Further inputs are: an inhibit input I; dialling option inputs D (D1 to define the inter-digit pause length, D2 to define alternative dialling speeds and D3 to define alternative mark/space ratios); and clock pulse inputs $\phi_1$ and $\phi_3$. Additional clock pulse phases $\phi_2$ and $\phi_4$ are generated in conventional manner on the chip 7. The devices on the chip are controlled in fourphase logic by these phases $\phi_1$ to $\phi_4$ so that there is a controlled stepping of data through the elements of the chip.

The chip 7 also has outputs: M for applying a dialling pulse masking signal to a masking relay 11; 0 for passing dialling pulses to a dialling relay 12; S for providing signals to operate card advance solenoids 13; RD to provide a signal to override an external power switch to maintain power to the chip for redialling; and DTD to emit a signal to define pauses for those numbers where the first digit is to create a dial tone pause during which a line for the remaining digits is sought. During this pause input I is actuated by an external coupling with output DTD.

Figure 3:
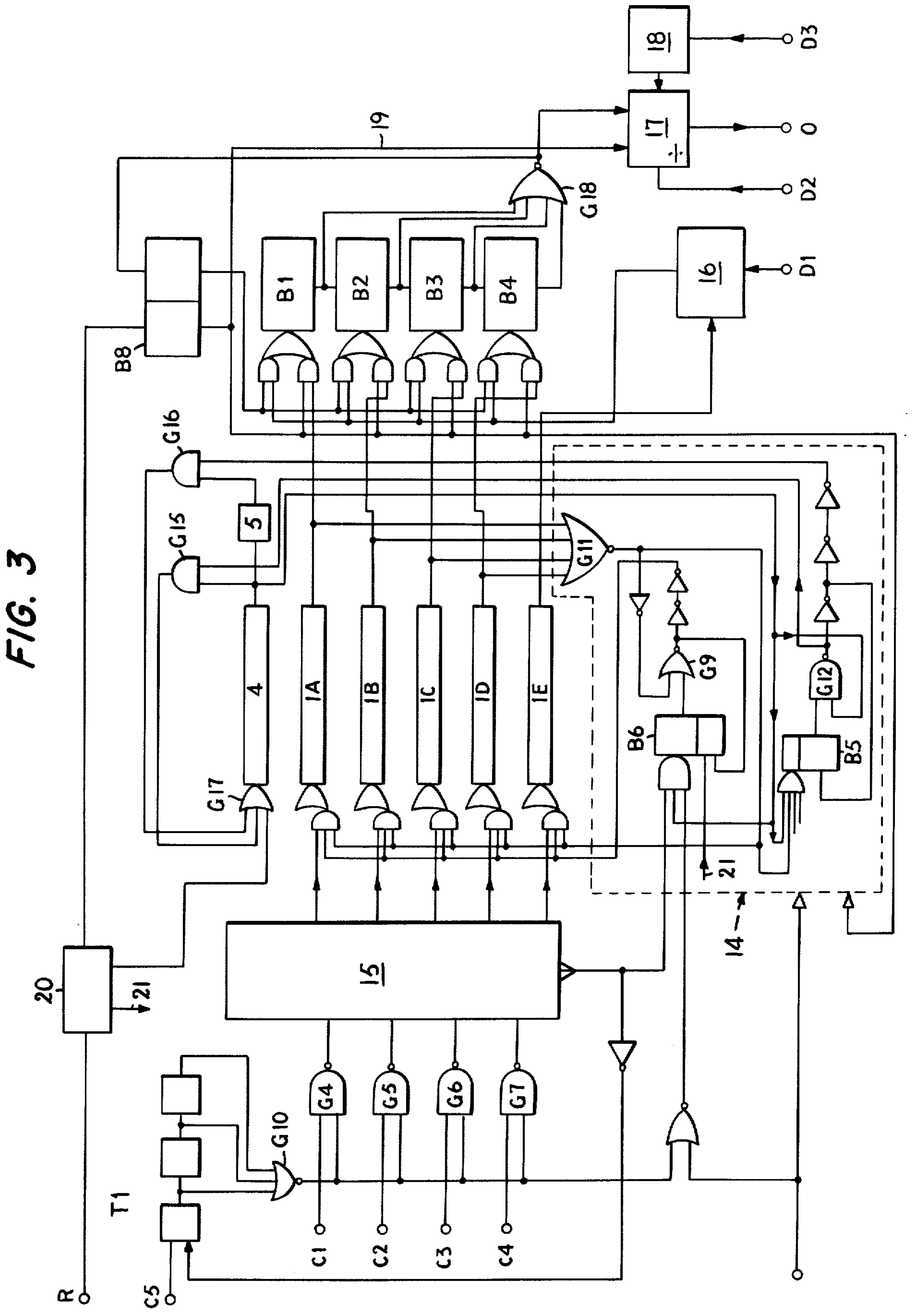
FIG. 3 is a block circuit diagram of a single integrated circuit chip of said dialler.
Figure 4A:
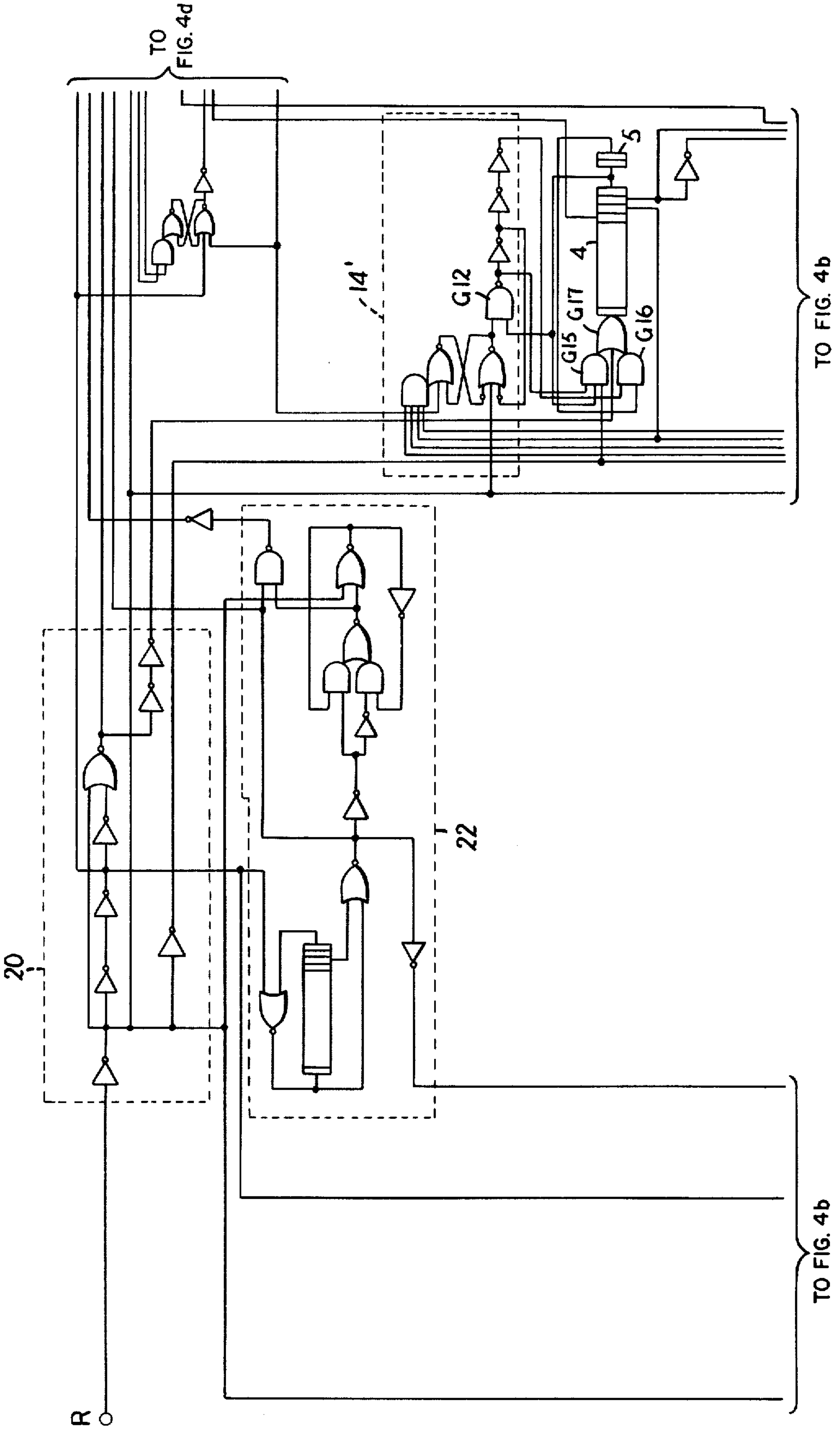
FIGS. 4*a*–4*e* show a logic circuit diagram for the chip.
Figure 4B:
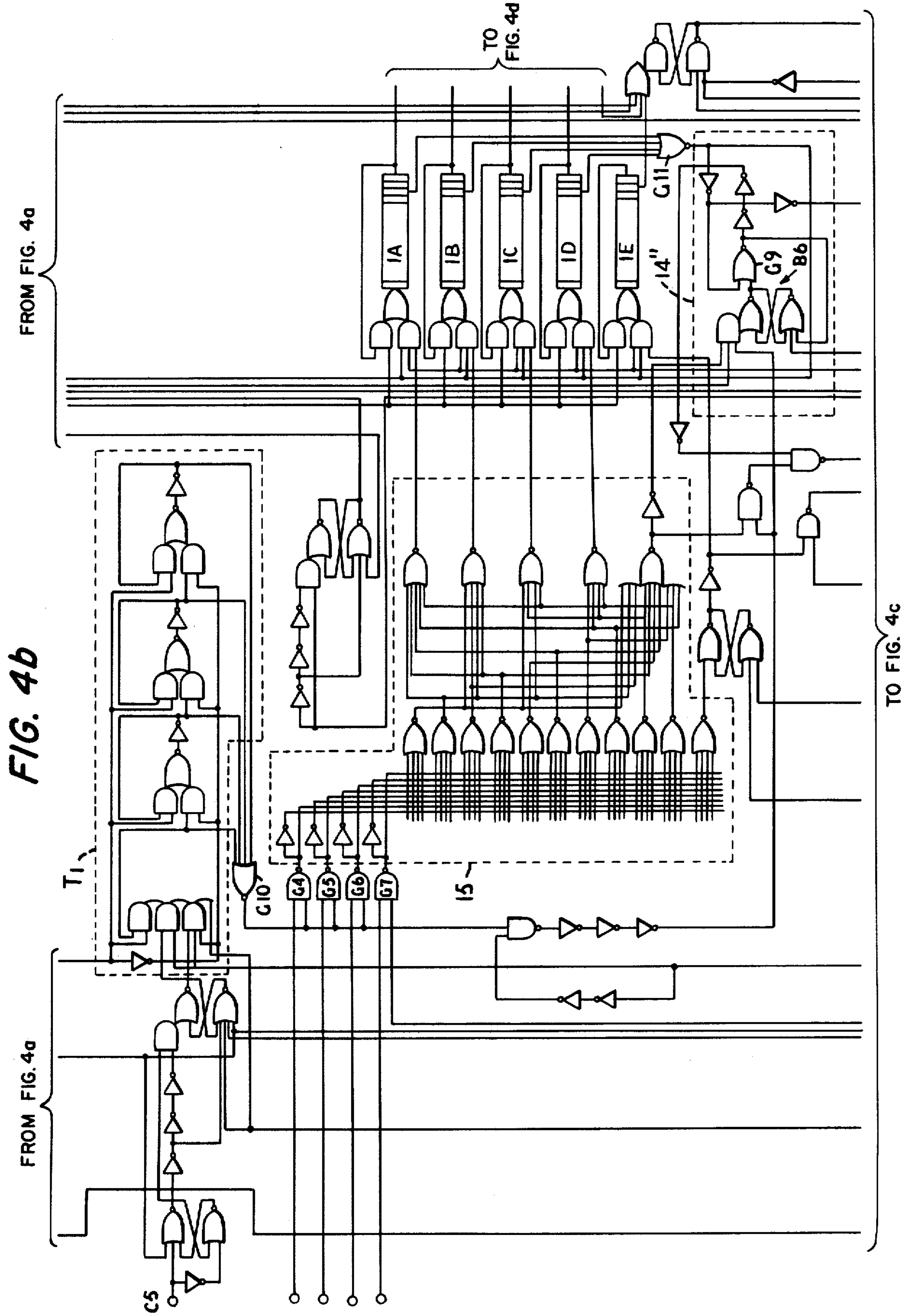
Figure 4C:
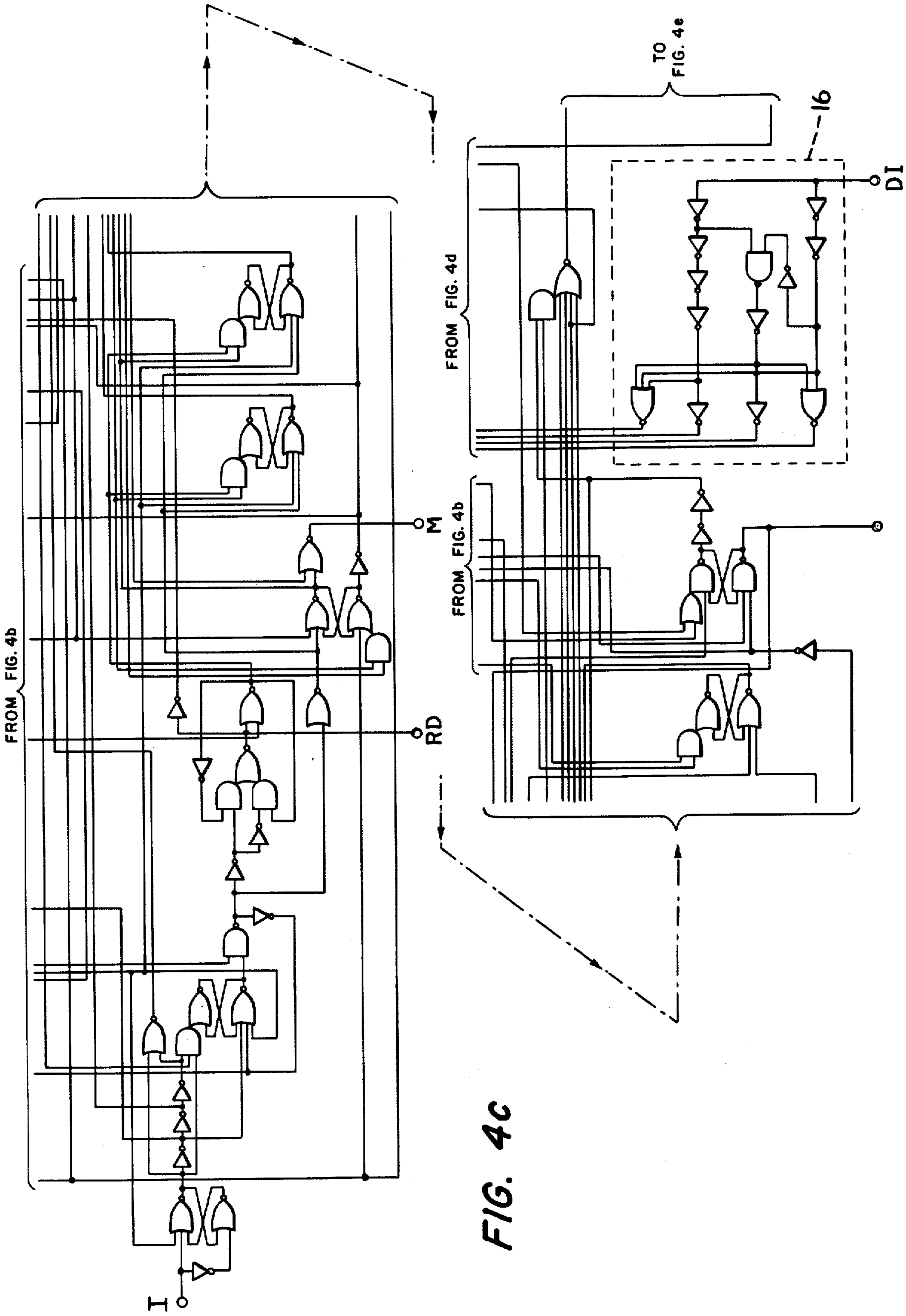
Figure 4D:
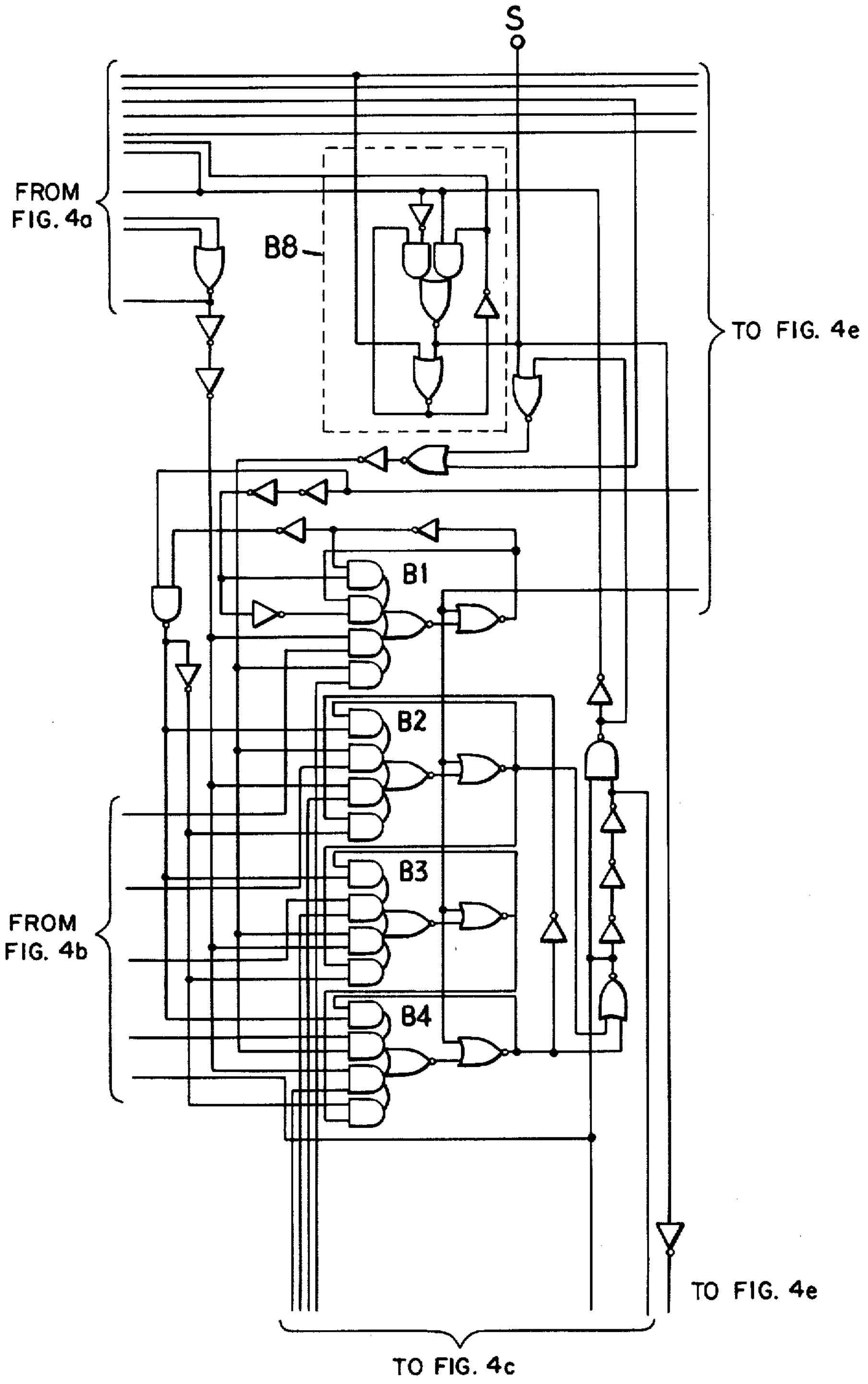
Figure 4E:
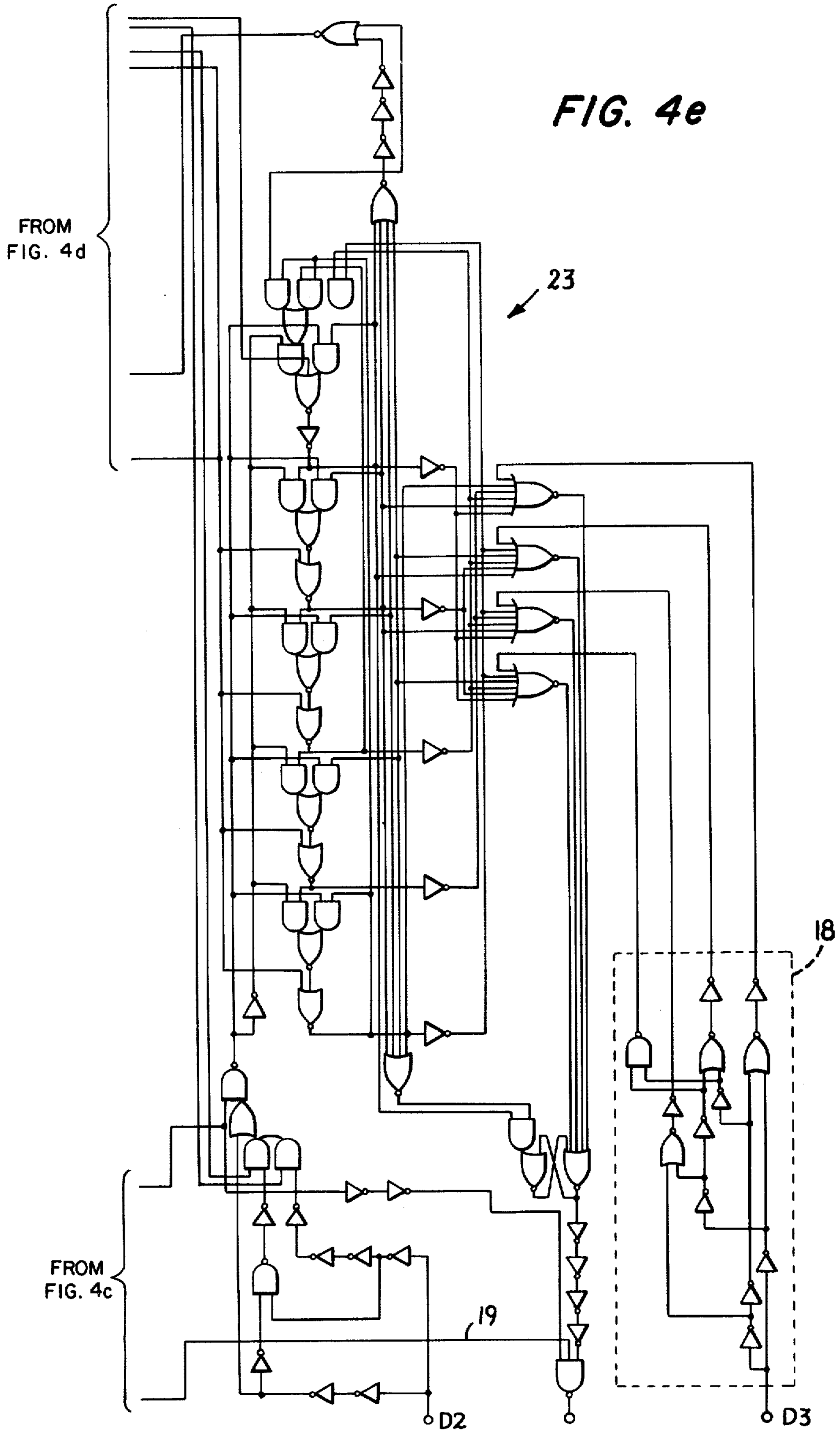

Reference will now be made to FIGS. 3 and 4 which show the logic of the chip 7.

FIG. 3 shows a basic block diagram illustrating the principal items of the chip.

Registers 1A, 1B, 1C and 1D constitute the store 1 of FIGS. 1*a* to 1*c* and register 4 and store 5 are also shown. An additional register 1E is provided to store the data defining a long interdigital pause. The 21 bit position of the registers 1A to 1D is monitored by logic circuitry 14 via a NOR gate G11 and the corresponding bit position of the marker register 4 is also monitored by circuitry 14. The outputs of the marker register 4 and store 5 are gated by AND gates G15 and G16 controlled by the circuitry 14. The gates G15 and G16 are connected to the input of the register 4 by an OR gate G17.

The data inputs C1 to C4 are shown at the left of FIG. 3 and are coupled to respective registers 1A to 1E by a code verifier and converter 15 and gates G4 to G7.

Associated with the input C5 is an anti-noise counter in the form of a timer T1 which effectively senses the presence of data at the inputs by sensing a signal at input C5. If the "data" is removed within 5 milliseconds, the timer is reset. If, on the other hand, the data still remains, it is gated to the code verifier and converter 15 by the gates G4 to G7. The verifier and converter 15 checks whether or not the data is in a valid code format, converts it to B.C.D. code and passes it onto registers 1A to 1E.

A valid code in the verifier and converter 15 is signalled to the logic circuitry 14. When the data is valid, when gate G11 senses a vacant bit position at the end of the registers 1A to 1D, which are being continually clocked with registers 1E and 4, and when the marker A is sensed at the end of the register 4, this information then passes via circuitry 14 to open the registers 1A to 1E to the verified data so that this data enters the sensed vacant bit position, which has now shifted to the first bit position.

A counter B1 to B4 is controlled by a bistable circuit B8, which is connected to be reset by way of the R input and can be set and reset by a NOR gate G18 when the counter has been counted to zero. When circit B8 is set in one of its states by G18, the counter B1 to B4 is open to the registers 1A to 1D, and when circuit B8 is set in its other state the counter is open to an interdigital pause circuit 16 controlled by input D1 to give one or other of two possible pause lengths (extendable by a bit in register 1E).

To produce the dialling pulses, there is provided a divider 17 containing a primary divider dividing the basic clock rate (18 KHz) of the chip by 30 and by 2, and a secondary divider giving further division by 30 to provide a pulse rate of 10 or 20 Hz depending upon the signal at input D2.

Once a number has been loaded into the counter B1 to B4 from registers 1A to 1D, gate G18 causes clock pulses to be fed from the divider provided input I is not activated.

The secondary divider has a basic division rate of 30 but intermediate states can be tapped to generate various mark/space ratios. This is achieved by logic circuit 18 controlled by input D3.

Every time the divider cycles, the number in the counter B1 to B4 is reduced by one and when the number eventually reaches zero gate G18 toggles bistable B8 to enter an interdigital pause number into the counter B1 to B4. This number will usually be eight and, as occurs with a number from 1A to 1D, it is counted down, but in this case no dialling pulses are emitted as the DIAL output O is in this condition blocked by a signal on line 19.

It is to be noted that the store number to be dialled is still in the registers 1A to 1D until the chip is reset. Thus if the required number is not obtained, and the chip has not been reset, the number will be automatically re-dialled on next lifting the handset, because then the chip is released for dialling by way of input I.

More particularly, if a number required has not been obtained on dialling, a redialling button, connected to input I, may be pressed to place a 1 on the inhibit input. Operation of the button also keeps the chip energised on replacing the handset. In this case, the marker circulates in alignment with the empty digit position adjacent the last digit of the sequence. When the handset is lifted and the button is again pressed a 0 appears at the input I which causes, via circuitry 14, the store 5 to come into operation to shift the marker bit until it again aligns with the first digit to be dialled.

Finally it is to be seen in FIG. 3 that the reset input R is connected to reset circuitry 20 to actuate the bistable B8, to insert the marker A by way of gate G17 and to provide a reset signal on line 21 for resetting the circuits of the chip.

FIG. 4 is a detailed circuit diagram of the chip 7 utilising four-phase logic. The numbers within the elements of FIG. 4 represent the pertinent phase by which they are operated. On this diagram elements have been indicated which have been described with reference to FIGS. 1 to 3. The divider 17 illustrated in FIG. 3 is in fact composed of two dividers, a primary divider 22 and a secondary divider 23 the positions of which have been indicated on FIG. 4. Attention is also drawn to the registers which are composed of segments alternately marked 2 and 4. Two of these segments together constitute one bit position. It will also be seen that the logic circuitry, e.g., gate G11, scans a bit position which is not the final bit position in each case but the preceding bit position. Where this occurs, the delays in signal transmission in the circuit elements are relied upon so that the effect is that of sensing the final bit position in each case.

The logic circuitry 14 of FIG. 3 is distributed throughout FIG. 4 but the two areas including major components of this circuitry have been indicated at 14' and 14''.

Finally, it is to be observed that the embodiments described above include a counter B1 to B4 which, on being counted down from a certain count, produces a corresponding number of dialling pulses. In the alternative, the counter B1 to B4 could be replaced by a multifrequency coding arrangement constructed to convert the data in the registers 1A to 1D into multifrequency coded signals.

I claim:

1. A storage arrangement for storing sequences of digits required for telephone dialling, the arrangment comprising: a first recirculating register means for storing a sequence of digits; a second recirculating register means for storing a marker bit to be recirculated synchronously with said sequence to mark the digit next to be read out from the first register means; an excess bit position of the second register means and which provides for the second register means a bit position in excess of the number of digit positions in the first register means; gate means having a first mode to cause the excess bit position to be bypassed so that the marker bit will circulate in alignment with a digit in the first register means and having a second mode to cause the excess bit position to be utilised to displace the marker bit rearwardly in relation to a sequence of digits in the first register means; and control means coupled to the register means and the gate means for controlling the gate means, in dependence upon marker bit position and upon the digit positions, (a) to position the marker bit to mark the first digit to be read out, (b) to set the gate means to the second mode to displace the marker bit by one position rearwardly on read-out of a digit to mark the next digit to be read-out, and (c), subsequent to read-out of all the digits, to set the gate means to the second mode to repeatedly offset the marker bit until it again marks the first digit of the sequence.

2. A storage arrangement according to claim 1, wherein the second register means has two recirculation paths, one for recirculating the marker bit through the second register means, including the excess bit position, and the second for recirculating the marker bit through the second register means but excluding the excess bit position, the paths containing gates connected to be controlled by the control means in the form of logic circuitry operable in response to the marker position and the position of data in the first register means.

3. A storage arrangement according to claim 1, wherein the first register means is connected to feed a dialling device for producing dialling signals corresponding to the digits supplied by the first register means.

4. A storage arrangement according to claim 3, and comprising a pause defining arrangement connected by logic gates to the dialling device for inserting data defining an interdigital pause into the dialling device.

5. A storage arrangement according to claim 4, and comprising a bistable device connected to control the logic gates to alternately connect the first register means and the pause defining arrangement to the dialling device, and the control means being coupled to the bistable device to control the gating of the excess bit position in dependence upon the state of the bistable device.

6. A storage arrangement according to claim 3, wherein the dialling device comprises a counter connected to a clock so as to be counted from its stored value to a predetermined value to provide dialling pulses corresponding in number to the stored value.

7. A storage arrangement acording to claim 1, and comprising a data verifier to which the control means is connected to control the supply of digits to the first register means in dependence upon the validity of data determined by the verifier.

8. A storage arrangement according to claim 1, wherein the control means is operable in response to all the digits of a sequence being read-out to set the gate means to its first mode to cause the marker bit to circulate in a condition marking an empty position of the first register means and is subsequently effective to respond to a signal calling for preparation for redialling to set the gate means to its second mode.

9. A storage arrangement according to claim 1, and comprising a gating arrangement for gating digits into the first register means, the gating arrangement being coupled to be controlled by the control means in dependence upon digit positions in the first register means.

10. A storage arrangement according to claim 9, wherein the control means is operable to produce a gating signal for the gating arrangement in dependence upon marker bit position to cause a digit to be entered into the position of the first register means which is marked by the marker bit of that position is empty and into the nearest empty position rearward of that position when that position contains a digit.

* * * * *